(12) United States Patent
Kalpakoff et al.

(10) Patent No.: US 7,823,800 B1
(45) Date of Patent: Nov. 2, 2010

(54) MISTING SYSTEM

(76) Inventors: Jeff Kalpakoff, 6575 N. Praying Monk Rd., Paradise Valley, AZ (US) 85253; Niko Lambesis, 4715 E. Thunderhawk Rd., Cave Creek, AZ (US) 85331

( * ) Notice: Subject to any disclaimer, the term of this patent is extended or adjusted under 35 U.S.C. 154(b) by 244 days.

(21) Appl. No.: 11/344,741

(22) Filed: Jan. 31, 2006

Related U.S. Application Data

(60) Provisional application No. 60/648,971, filed on Jan. 31, 2005.

(51) Int. Cl.
*A01G 25/09* (2006.01)
*B05B 17/00* (2006.01)

(52) U.S. Cl. .................. 239/1; 239/266; 239/236; 239/550; 239/565; 239/600; 239/267; 285/107; 285/110

(58) Field of Classification Search .............. 239/600, 239/266, 267, 550, 236, 565, 1; 285/107, 285/110
See application file for complete search history.

(56) References Cited

U.S. PATENT DOCUMENTS

| | | | |
|---|---|---|---|
| 999,169 A * | 7/1911 | Jones | 285/107 |
| 1,390,047 A | 9/1921 | Lange | |
| 2,969,185 A * | 1/1961 | Geiger | 239/63 |
| 3,490,561 A | 1/1970 | Colgan | |
| 4,524,835 A * | 6/1985 | Mingrone | 169/65 |
| 5,230,539 A * | 7/1993 | Olson | 285/323 |
| 5,337,960 A * | 8/1994 | Allen | 239/280.5 |
| 5,441,202 A | 8/1995 | Wintering et al. | |
| 5,540,383 A * | 7/1996 | Ducey | 239/1 |
| 5,651,502 A * | 7/1997 | Edwards | 239/450 |
| 5,862,987 A * | 1/1999 | Reif | 239/209 |
| 5,961,047 A | 10/1999 | Kleinberger | |
| 6,015,099 A | 1/2000 | Ducey | |
| 6,065,693 A * | 5/2000 | Lukas | 239/548 |
| 6,212,897 B1 * | 4/2001 | Wang | 62/314 |
| 6,237,860 B1 | 5/2001 | Ducey | |
| 6,315,219 B1 * | 11/2001 | Palestrant | 239/550 |
| 6,786,701 B1 * | 9/2004 | Huang et al. | 417/199.1 |
| 6,942,166 B2 * | 9/2005 | Tanimoto | 239/547 |
| 6,948,648 B2 | 9/2005 | Armstrong et al. | |
| 2005/0077391 A1 | 4/2005 | Powell et al. | |
| 2005/0082390 A1 | 4/2005 | Ferrono | |

* cited by examiner

*Primary Examiner*—Dinh Q Nguyen
(74) *Attorney, Agent, or Firm*—Booth Udall, PLC

(57) ABSTRACT

A misting system may include at least one prefabricated mist line comprising at least one mist tee having at least one arm extending outwardly from a body, a latitudinal threaded hole defined in the body, and a longitudinal hole extending through the at least one arm and at least into the body and in fluid communication with the latitudinal threaded hole. A method of forming a misting system may include prefabricating at least one mist line by: aligning an end of at least one tube having a hole there through of a first predetermined diameter with at least one arm of at least one misting tee that is of a second predetermined diameter greater than the first predetermined diameter; and press-fitting the at least one arm into the end of the at least one tube, thereby deforming an end portion of the at least one tube.

28 Claims, 4 Drawing Sheets

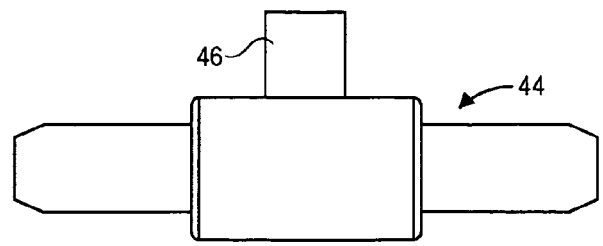
FIG. 7
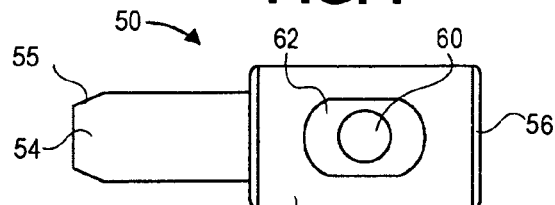
FIG. 8
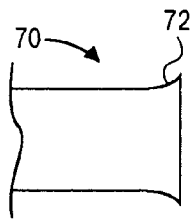 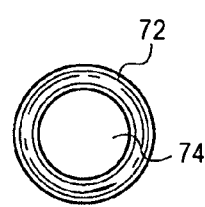 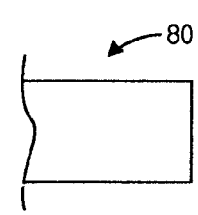
FIG. 9  FIG. 10  FIG. 11
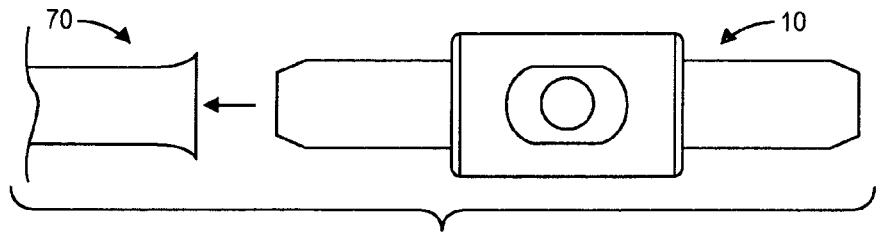
FIG. 12
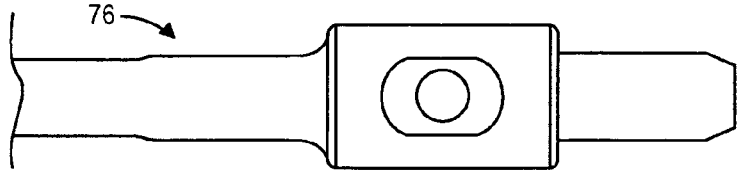
FIG. 13
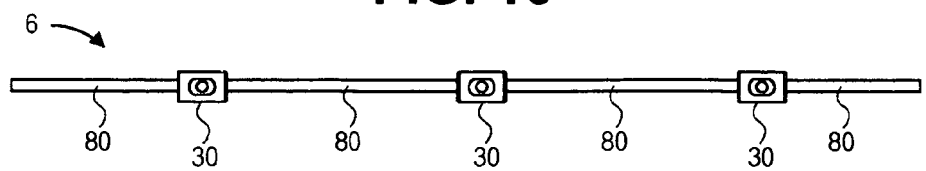
FIG. 14

MISTING SYSTEM

CROSS REFERENCE TO RELATED APPLICATION

This application claims priority to U.S. Provisional Patent Application to Jeff Kalpakoff and Niko Lambesis entitled "Mist Tee, Mist Line, and Misting System," Ser. No. 60/648,971, filed Jan. 31, 2005, now pending, the disclosure of which is hereby incorporated entirely herein by reference.

BACKGROUND

1. Technical Field

This document relates to a misting system.

2. Background Art

Conventional low-pressure misting systems exist. However, conventional low-pressure misting systems are formed of bulky components such as PVC piping and PVC couplings that require extensive time and effort to manufacture and install, in large part due to the priming and gluing of each joint. Furthermore, the large nozzles on these conventional low-pressure misting systems often do not create atomization of the water and just drip instead. Moreover, these conventional low-pressure misting systems cannot be converted to a high-pressure misting system. That is, they are not compatible with any thing beyond a garden hose; that is they cannot be used with a high pressure pumps for example.

Conventional high-pressure misting systems exist. However, conventional high-pressure misting systems also are formed of piping and couplings that require extensive time and effort to manufacture and install, in large part due to the preparation (e.g., sanding and fluxing) and soldering or welding of each joint.

SUMMARY

In an aspect, this document features a misting system. One misting system implementation may include at least one prefabricated mist line having at least one mist tee comprising: a body; at least one arm extending outwardly from the body; a latitudinal threaded hole defined in the body; and a longitudinal hole extending through the at least one arm and at least into the body and in fluid communication with the latitudinal threaded hole.

Other related implementations may include one or more of the following. A countersink may be defined in a surface of the body that surrounds an outer opening of the latitudinal threaded hole. The at least one arm may include a tapered lead in at a free end portion of the at least one arm. The at least one prefabricated mist line may further comprise at least one tube, wherein the at least one mist tee and the at least one tube are press-fit together. The at least one arm may comprise opposing arms extending outwardly from the body and the longitudinal hole may extend through each arm and the body and may be in fluid communication with the latitudinal threaded hole. Each arm may also comprise a tapered lead in at a free end portion of the arm. The at least one prefabricated mist line may be rated up to about 150 psi to about 5,000 psi, or more specifically up to about 200 psi to about 2,000 psi. The misting system may further comprise at least one union, at least one clamp, and at least one screw and anchor. The at least one prefabricated mist line may comprise two prefabricated mist lines. In addition, the misting system may also include at least one feed line, at least one filter, at least one union, at least one end plug, at least one elbow, at least one clamp, and at least one screw and anchor.

Another misting system implementation may include at least one prefabricated mist line having at least one mist tee comprising: a central body; opposing arms extending outwardly from opposite ends of the central body; a latitudinal threaded hole defined in the body; and a longitudinal through hole extending through each arm and the body and in fluid communication with the latitudinal threaded through hole; and at least one tube; wherein the at least one mist tee and the at least one tube are press-fit together.

Other related implementations may include one or more of the following. At least one mist nozzle may be threadably and removably coupled with the latitudinal threaded hole. A countersink may be defined in a surface of the body that surrounds an outer opening of the latitudinal threaded hole. Each arm of the at least one mist tee may comprise a tapered lead in at a free end portion of the arm. The at least one tube may have at least one flared end abutting the body, thereby forming a curved transition between the body and the at least one tube. The at least one tube may comprise at least two tubes, wherein the at least one mist tee is press-fit between the at least two tubes. The at least one mist tee may comprise at least two mist tees and the at least one tube may comprise at least three tubes, wherein the at least two mist tees are press-fit between the at least three tubes. The at least one mist tee may comprise at least three mist tees and the at least one tube may comprise at least four tubes, wherein the at least three mist tees are press-fit between the at least four tubes. The at least one prefabricated mist line may be rated up to about 150 psi to about 5,000 psi, or more specifically up to about 200 psi to about 2,000 psi. The misting system may further comprise at least one union, at least one clamp, and at least one screw and anchor. The at least one prefabricated mist line may comprise two prefabricated mist lines. In addition, the misting system may also include at least one feed line, at least one filter, at least one union, at least one end plug, at least one elbow, at least one clamp, and at least one screw and anchor.

In another aspect, this document features a method of forming a misting system. The method may include prefabricating at least one mist line by: aligning an end of at least one tube having a hole there through of a first predetermined diameter with at least one arm of at least one misting tee that is of a second predetermined diameter greater than the first predetermined diameter; and press-fitting the at least one arm into the end of the at least one tube, thereby deforming an end portion of the at least one tube.

Implementations may include one or more of the following. The steps of providing at least one tube, aligning an end of the at least one tube, and press-fitting the at least one arm may respectively include providing at least one tube having at least one flared end, aligning the flared end of the at least one tube with the at least one arm, and forming a curved transition between the body and the at least one tube. The step of providing at least one mist tee may include providing at least one arm having a tapered lead in at a free end portion thereof.

All of the foregoing and other implementations may have one or more of the following advantages. In comparison to standard gluing, soldering, and/or welding methods, the press-fit technology incorporated into misting system implementations exhibit many benefits. There is no thermal stress on misting system components and the process is environmentally friendly—no generation of fumes or gases or requirement of cleaning fluids either. There are also no cold solder joints. Additionally, an important but often underrated positive aspect of press-fit technology is the advantage that press-fit technology has with respect of the efficient and cost effective manufacturing of mist line implementations. Economic comparison between press-fit technology and solder technology for example shows that the efficiencies achieved with press-fit assembly are substantial in comparison with the solder process. Furthermore, misting system implementations are very easy to install and their lengths are easy to extend with extension kits. Moreover, misting system implementations may be used in both low-pressure and high-pressure applications.

The foregoing and other aspects, features, and advantages will be apparent from the DESCRIPTION and DRAWINGS, and from the CLAIMS.

BRIEF DESCRIPTION OF DRAWINGS

Implementations will hereinafter be described in conjunction with the appended DRAWINGS.

FIGS. 6-7 are front views of other mist tee implementations.

FIG. 8 is a side view of another mist tee implementation.

FIGS. 9-10 are front and end views respectively of a flared tubing implementation.

FIG. 11 is a front view of another tubing implementation.

FIGS. 12-13 are front views of the mist tee of FIG. 4 and the tubing of FIG. 9 during a method implementation of forming a misting system.

FIG. 14 is a front view of a prefabricated mist line implementation.

DESCRIPTION

1. Mist Tee

Figure 4:
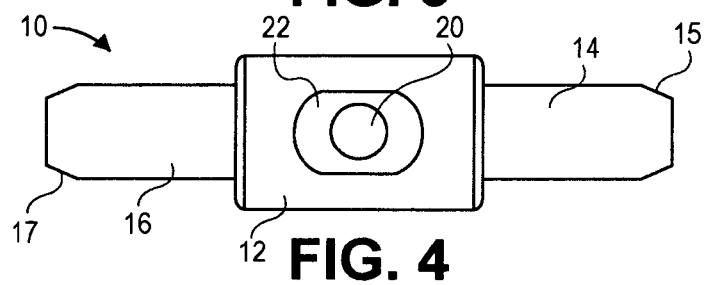
FIGS. 4-5 are front and end views respectively of a mist tee implementation.
Figure 5:
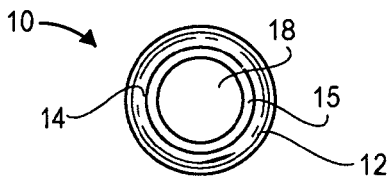

There are a variety of mist tee implementations. Notwithstanding, with reference to FIGS. 4-5 and for the exemplary purposes of this disclosure, mist tee 10 is an example of a mist tee implementation. Mist tee 10 may have a central body 12 with opposing arms 14 and 16 extending outwardly there from. The central body 12 may have a latitudinal threaded through hole 20 defined in the body 12 and a longitudinal hole 18 may extend through each arm 14 and 16 and the body 12 and may be in fluid communication with the latitudinal threaded hole 20. A countersink 22 may be defined in a surface of the central body 12 and may surround the outer opening of the latitudinal threaded through hole 20. The countersink 22 provides a suitable surface to seat the o-ring seal of a misting nozzle to prevent leakage. The free end portion of each arm 14 and 16 may include tapered lead ins 15 and 17 respectively.

Figure 6:
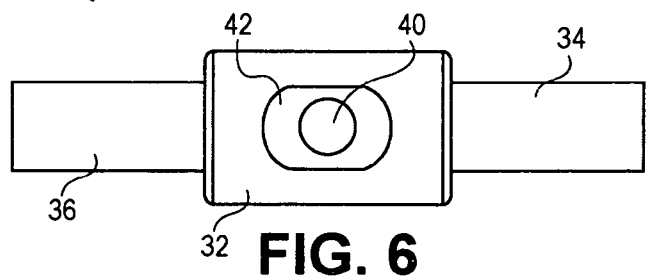

Many additional mist tee implementations are possible. For the exemplary purposes of this disclosure and referring to FIG. 6, an alternative mist tee 30 is depicted. Mist tee 30 is substantially similar to mist tee 10 previously described. The principal differences between them relates to their arms. In particular, mist tee 30 includes body 32, longitudinal threaded hole 40 and countersink 42. However, arms 34 and 36 do not include any tapered lead ins.

For the exemplary purposes of this disclosure and referring to FIG. 7, an alternative mist tee 44 is depicted. Mist tee 44 is substantially similar to mist tee 10 previously described. The principal difference between them is the body extension 46 of mist tee 50. The latitudinal threaded through hole 20 may be defined in the extension 46 and the body 12 and the longitudinal hole 18 may extend through each arm 14 and 16 and the body 12 and may be in fluid communication with the latitudinal threaded hole 20. A countersink 22 may be defined in a surface of the extension 46 and may surround the outer opening of the latitudinal threaded through hole 20.

For the exemplary purposes of this disclosure and referring to FIG. 8, an alternative mist tee 50 is depicted. Mist tee 50 is substantially similar to mist tee 10 previously described. The principal differences between them relates to their arms. In particular, mist tee 50 includes body 52, longitudinal threaded hole 60 and countersink 62. However, mist tee 50 only includes one arm 54 with tapered lead in 55 while the free end 56 of body 52 is sealed. Thus, a longitudinal hole extends through arm 54 and into body 52 and is in fluid communication with latitudinal threaded hole 60.

For the exemplary purposes of this disclosure, another mist tee implementation may be substantially similar to the mist tee 10 previously described. The principal differences between them relates to their arms. In particular, the arms of this particular mist tee implementation may or may not include tapered lead ins. However, the arms themselves from the body to the tapered lead ins or the ends themselves as the case may be are also slightly tapered (to a lesser degree than the tapered lead ins). The tapering along the entire length of the arm may facilitate the press-fit between the arm and a tube.

For the exemplary purposes of this disclosure, other mist tee implementations may not have countersinks, while others may have curved transitions between their central bodies and arms. Even other mist tee implementations may have two or more latitudinal threaded holes defined in their bodies for accommodating two or more nozzles on the same mist tee.

Further implementations are within the CLAIMS.

2. Mist Line

There are a variety of mist line implementations. Notwithstanding, with reference to FIGS. 1-2, 4-5, and 12-13 and for the exemplary purposes of this disclosure, mist line 2 is an example of a mist line implementation. Mist line 2 may be prefabricated and may include at least one mist tee 10 as previously described and at least two tubes 70, the at least one mist tee 10 press-fit between the at least two tubes 70. The at least two tubes 70 may each have at least one flared lead in 72 abutting the body 12, thereby forming curved transitions between the body 12 and the at least two tubes 70. At least one mist nozzle 90 may be threadably and removably coupled with the latitudinal threaded hole 20.

Figure 1:
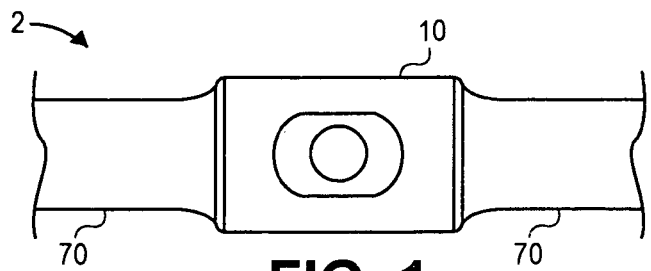
FIGS. 1-3 are front views of a prefabricated mist line implementation.
Figure 2:
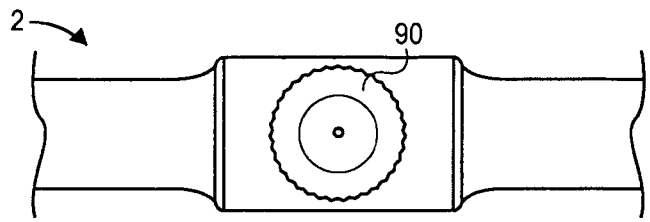
Figure 3:
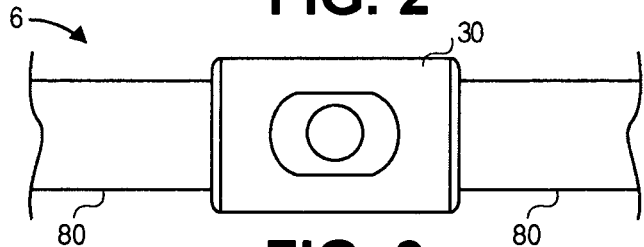

Many additional mist line implementations are possible. For the exemplary purposes of this disclosure and referring to FIGS. 3, 11, and 14, an alternative mist line implementation is depicted. Mist line 6 is substantially similar to mist line 2 previously described. The principal differences between them relates to their tubing and mist tees. In particular, mist line 6 uses at least two tubes 80 whose ends have not been flared. When at least one mist tee 30 as previously described is press-fit between the at least two tubes 80, the ends of the at least two tubes 80 abut the body 32 without forming curved transitions between the body 32 and the at least two tubes 80.

For the exemplary purposes of this disclosure, alternative mist line implementations may include a plurality of mist tee implementations press-fit between a plurality of tubes, as well as a plurality of mist nozzles. For example, at least two mist tees and at least three tubes may be provided, the at least two mist tees press-fit between the at least three tubes. Additionally, at least three mist tees and at least four tubes maybe provided, the at least three mist tees press-fit between the at least four tubes. Other mist line implementations are also possible that use at least four mist tees and at least five tubes, at least five mist tees and at least six tubes, and so on.

Any of the foregoing or other mist line implementations may be rated up to about 150 psi to about 5,000 psi. More specifically, they may be rated up to about 200 psi to about 2,000 psi.

Further implementations are within the CLAIMS.

3. Misting System

Figure 15:
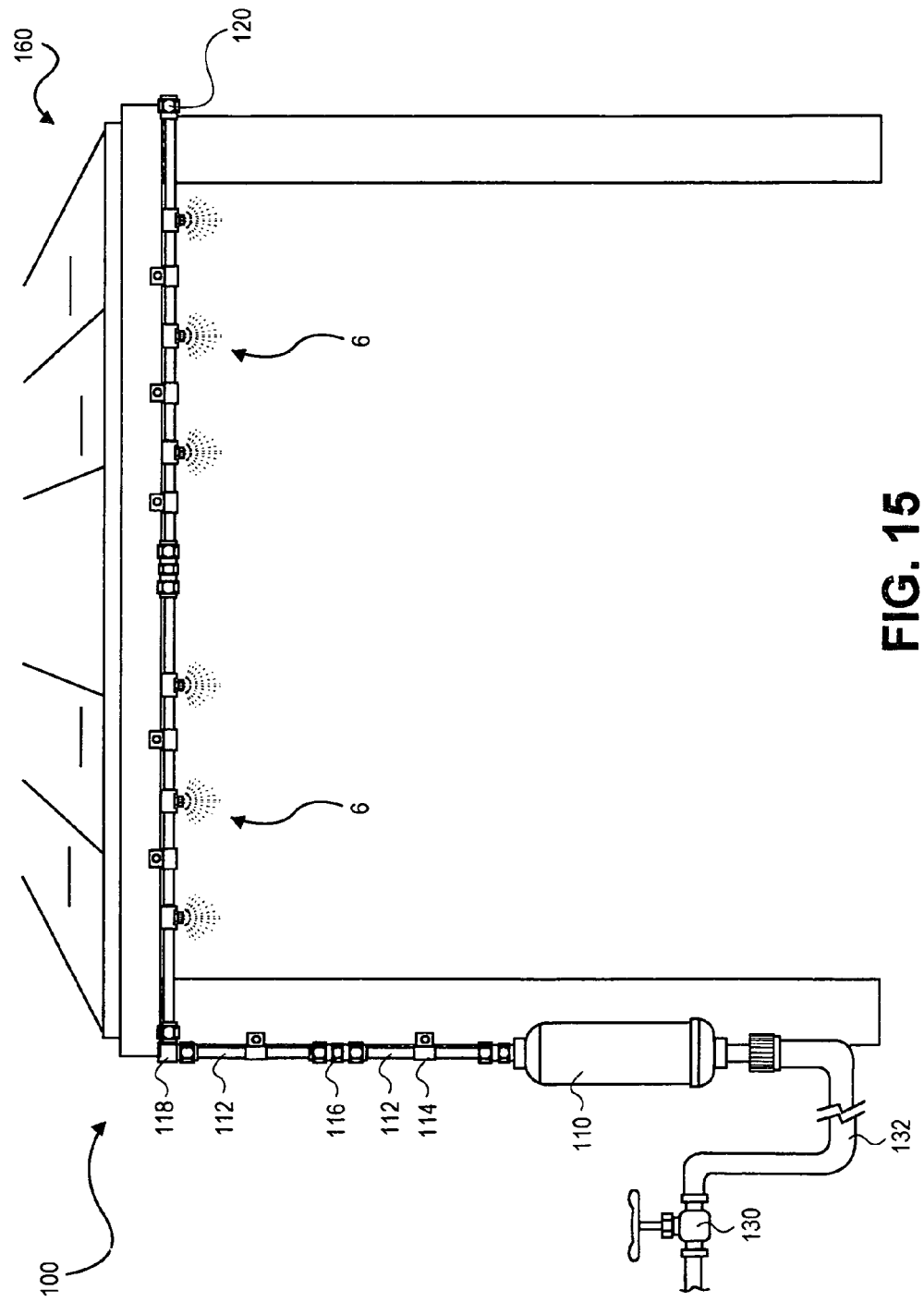
FIGS. 15-16 are front views respectively of misting system implementations.

There is a variety of misting system implementations. Notwithstanding, with reference to FIG. 15 and for the exemplary purposes of this disclosure, misting system 100 is an example of a low-pressure misting system implementation. Misting system 100 is shown attached to a garden hose 132 (e.g., about 25-30 psi) and cooling a patio 160. Misting system 100 may include filter 110 which may be a 5 micron sediment filter. One end of filter 110 is connected to garden hose 132 and the other end is connected to a first feed line 112. One end of the second feed line 112 is connected to the first feed line 112 via a union 116. The other end of the second feed line 112 is connected to a first mist line 6 with another union 116. The two mist lines 6 are connected by another union 116 and an end plug 120 seals off the end of the second mist line 6. Clamps 114 with screws and anchors serve to mount and hold the foregoing components in position on patio 160.

Figure 16:
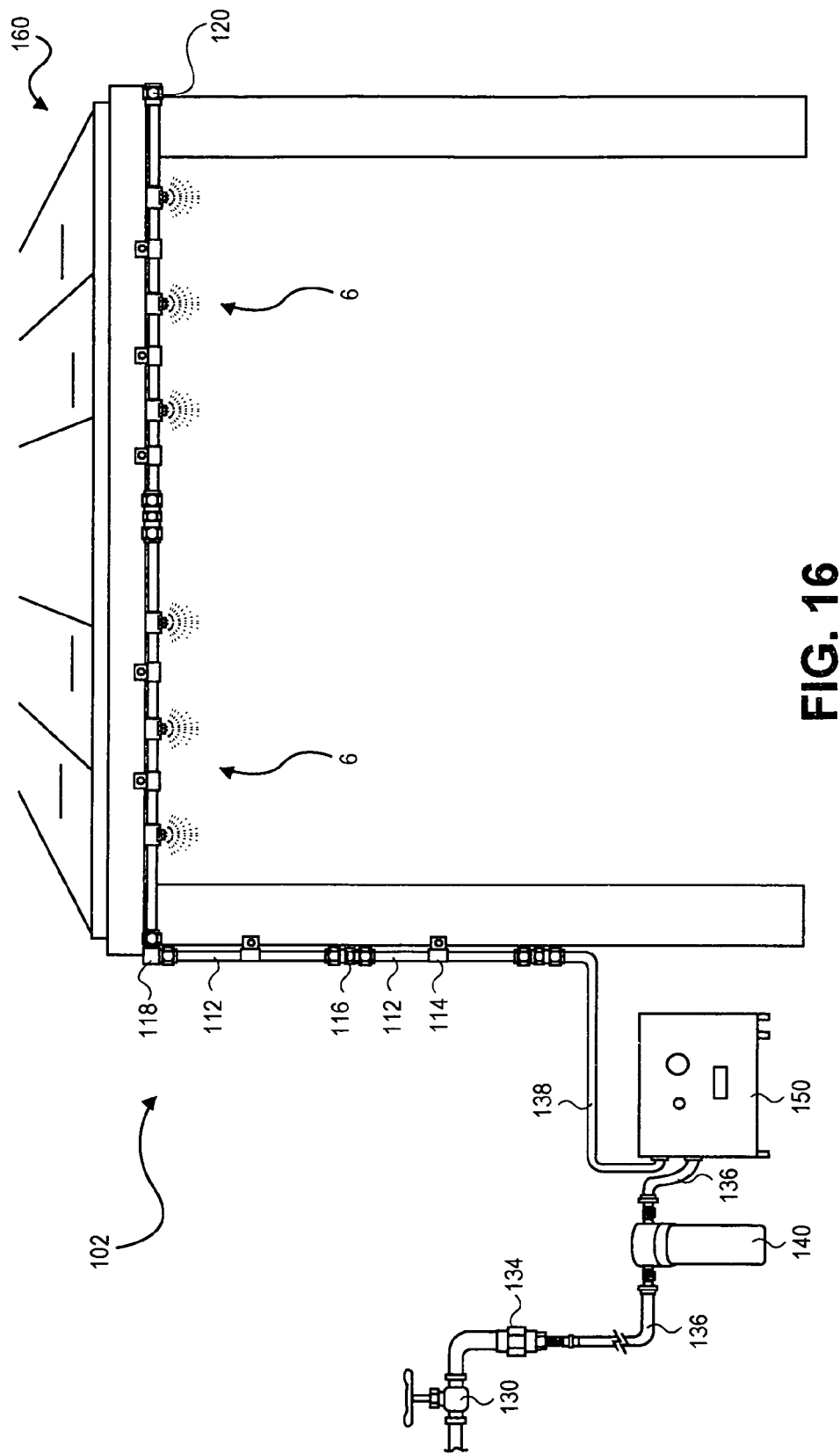

Turning to FIG. 16 and for the exemplary purposes of this disclosure, misting system 102 is an example of a high-pressure misting system implementation. Misting system 102 is substantially similar to misting system 100 as previously described, even including the same mist lines 6, feed lines 112, clamps 114, unions 116, elbow 118 and end plug 120 as used in misting system 100. The principal differences between them relates to their operation at different pressures. In particular, misting system 102 is depicted as including a high-pressure pump 150 (e.g., about 150-5,000 psi or more) and cooling a patio 160. Misting system 102 also includes a filter 140 between the faucet 130 and the pump 150. The filter is connected to the faucet by hose adapter 134 and lock on hose 136. The pump 150 is connected to feed line 112 with union 116 and lock on hose 138.

Many additional misting system implementations are possible. For the exemplary purposes of this disclosure, other misting system implementations may further comprise, in addition to at least one mist line, at least one union, at least one clamp, and at least one screw and anchor. Even other misting systems may include, in addition to at least one mist line, at least one feed line, at least one filter, at least one union, at least one end plug, at least one elbow, at least one clamp, and at least one screw and anchor.

For the exemplary purposes of this disclosure, still other misting system implementations may comprise everything that is needed to mist a 12' patio for example, such as two prefabricated mist lines, two flexible feed lines, six nozzles, one water filter, three unions, one elbow, one end plug, and six to ten clamps, screws, and anchors.

For the exemplary purposes of this disclosure, another misting system implementation may be an extension kit and may comprise everything that is needed to lengthen the foregoing misting system implementation by about 6' to about 12' for example, such as one to two prefabricated mist lines, three to six nozzles, one to two unions, one elbow, and three to six clamps, screws, and anchors. Using an ordinary garden hose, misting system implementations may be extended up to about 150', but if using a high-pressure pump, misting system implementations may be extended even longer.

Further implementations are within the CLAIMS.

4. Specifications, Materials, Manufacture, Assembly, and Installation

It will be understood that mist tee, mist line, and misting system implementations are not limited to the specific devices and components disclosed herein, as virtually any devices and components consistent with the intended operation of a mist tee, mist line, and/or misting system implementation may be utilized. Accordingly, for example, although particular mist tees, mist lines, misting systems, mist nozzles, filters, adapters, feed lines, coupling devices for connecting parts (e.g., unions, elbows, and tees), end caps, screws, anchors, clamps, and other components are disclosed, such components may comprise any shape, size, style, type, model, version, class, measurement, concentration, material, weight, quantity, and/or the like consistent with the intended operation of a mist tee, mist line, and/or misting system implementation. Implementations are not limited to uses of any specific components; provided that the components selected are consistent with the intended operation of a mist tee, mist line, and/or misting system implementation.

Accordingly, the components defining any misting system implementation may be formed of any of many different types of materials or combinations thereof that can readily be formed into shaped objects provided that the components selected are consistent with the intended operation of a mist tee, mist line, and/or misting system implementation. For example, the components may be formed of: rubbers (synthetic and/or natural); glasses, such as fiberglass, carbon-fiber, aramid-fiber, and/or other like materials; polymers such as plastic, polycarbonate, PVC plastic, ABS plastic, polystyrene, polypropylene, nylon, any combination thereof, and/or other like materials; metals, such as zinc, magnesium, titanium, copper, brass, iron, steel, stainless steel, any combination thereof, and/or other like materials; alloys, such as aluminum, and/or other like materials; any other suitable material; and/or any combination thereof.

Thus, for the exemplary purposes of this disclosure, a particular brass or stainless steel mist tee implementation may comprise a balanced, symmetrical, two-tiered cylindrical, overall shape that may have an overall length of approximately 2.125 inches ±0.010. The central body may have an outside diameter of approximately 0.500 inches ±0.010 and each arm may have an outside diameter of approximately 0.326 inches ±0.010. The latitudinal threaded hole may have approximately a 10-24 to 12-24 thread size. A particular copper or stainless steel tubing implementation may have an outside diameter of approximately 0.375 inches ±0.010 and an inside diameter of approximately 0.320 inches ±0.010. A particular mist line implementation may have mist tees and accompanying nozzles spaced apart between tubes about every 18" to 30".

Furthermore, the components defining any misting system implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, milling, stamping, cutting, welding, soldering, riveting, punching, and/or the like.

Any components manufactured separately may then be coupled with one another or other parts in any manner, such as by press-fitting, compression-fitting, slip-fitting, fastening, any combination thereof, and/or the like for example, depending on, among other considerations, the particular material forming the components. It will be understood that the assembly of any mist line and misting system implementation is not limited to a specific order of steps, since various assembly processes and sequences of steps may be used to assemble mist line and misting system implementations.

Accordingly, and for the exemplary purposes of this disclosure, in forming the particular misting system implementation depicted in FIGS. 1-2, 4, and 12-13, the cross section of arm 14 needs to be greater than the diameter of hole 74 in tubing 70. The difference in arm cross section and hole diameter results in a deformation 76 of the hole 74/tubing 70 during the insertion process of arm 14 into hole 74, but depending on design and material specifications, the cross section of arm 14 could be made to deform instead.

Specifically, at least one mist line 2 may be prefabricated by first aligning an end of at least one tube 70 having a hole 74 there through of a first predetermined diameter with at least one arm 16 of at least one misting tee 10 that is of a second predetermined diameter greater than the first predetermined diameter. Then the at least one arm 16 may be press-fit into the flared end 72 of the at least one tube 70. As this occurs, a deformation 76 in an end portion of the at least one tube 70 is formed, as well as a curved transition between the body 12 and the at least one tube 70.

Additionally, all the mist tees and tubing sections may be press-fit together simultaneously to form a mist line. That is if three mist tees and four tubing sections are provided for example, the mist tees may be placed between the tubing sections, aligning the ends of the tubes with the arms of the misting tees, and then the tees and tubes may all be press-fit together simultaneously to form a mist line, such as mist line 6 of FIG. 14 for example.

In describing the installation and maintenance of misting system implementations, reference will be made to a particular misting system that is commercially available, along with all its components, by and through AEROMIST, 23610N. 20th Dr., Ste. 6, Phoenix, Ariz. 85085 (www.aeromist.com). Generally, the 12' Copper Professional Misting System, Model 52500, includes the following components: two prefabricated 6' mist lines, Model 52519; two flexible nylon feed lines or tubes, Model 52516; one sediment filter, Model 52505; six 0.014 misting nozzles, Model 52502; two unions, Model 52510; one end plug, Model 52513; one elbow, Model 52511; and ten vinyl coated clamps with accompanying screws and anchors.

Start by measuring the length of the patio perimeter (or perimeter of the area to be misted). Proper installation of the new Aeromist 12' Copper Professional Misting System, Model 52500, requires mounting the Pre-Fabricated Misting Line (52519) on the bottom outside edge of the fascia, header or beam of patio perimeter.

It is important to mount the line along the bottom edge, to prevent mist from spraying on the structure. This installation will create a curtain of mist around the patio or misted area and provide maximum cooling. The Aeromist Misting System Extension Kit (52501) can extend the misting system by 6 ft. Add multiple extension kits to custom fit a misting system to the patio or misted area up to 150 ft (more with optional high-pressure pump).

Then, start installation by connecting Flexible Nylon Tube (52516) to outlet compression fitting on the Sediment Filter (52505). Finger tighten brass fitting, then insert tubing until it bottoms out in fitting. Complete seal with one wrench turn of fitting. Use Vinyl-Coated Clamps, Screws And Anchors (52509) to secure nylon tubing and filter to the side of the structure. Use Brass Union (52510) to connect additional tubing.

Next, use Brass Elbow (52511) to connect Pre-Fabricated Misting Line (52519) to Flexible Nylon Tube (52516). Then, secure Pre-Fabricated Misting Line (52519) to the bottom outside edge of fascia, header or beam with Vinyl-Coated Clamps, Screws And Anchors (52509). If necessary, cut the Pre-Fabricated Misting Line (52519) with a tubing cutter. Space the clamps on Pre-Fabricated Misting Line (52519) about 24" apart. Use Brass Union (52510) to join sections of Pre-Fabricated Misting Line (52519). Terminate the system with Brass End Plug (52513).

Last, connect a garden hose to the inlet of Sediment Filter (52505) and flush the system for several minutes before inserting nozzles. While the system is flushing, start inserting the 0.014 Misting Nozzles (52502) nearest the filter first. Shut the water off to insert the last nozzle. Only hand-tighten the nozzles.

As far as maintenance goes, when turning the misting system off, it is beneficial to drain the water out of the line by disconnecting the garden hose at the filter. This will help eliminate mineral buildup. Nozzles require cleaning or replacement periodically. Clean nozzles by soaking in vinegar or a calcium removal product overnight. Replace the filter annually. Water conditions may require replacement sooner though. Winterize the misting system by removing all nozzles. Be sure all water is drained from the misting lines. This will prevent water from freezing damaging the mist line. For summer season start-up, follow the last step in the installation procedure outlined above.

While the installation of a particular misting system implementation has been described in a particular sequence of steps, it will be understood that the installation is not limited to the specific order of steps as disclosed. Any steps or sequence of steps of the installation indicated above are given as examples of possible steps or sequence of steps and not as limitations, since various installation processes and sequences of steps may be used to install this misting system implementation. Moreover, other misting system implementations may be installed in similar or different manners.

4. Use

Misting System implementations are particularly useful with patios. However, implementations are not limited to uses relating to patios. Rather, any description relating to patios is for the exemplary purposes of this disclosure, and implementations may also be used in a variety of applications with similar results, such as pool areas, gazebos, playgrounds, dog runs, aviaries, horse stables, cattle pens, chicken runs, barns, greenhouses, gardens, wineries, textile processing plants, restaurants, break areas, schools, car washes, theme parks, zoos, athletic facilities, golf courses, waste transfer stations, construction sites, and the like.

The invention claimed is:
1. A misting system comprising:
   at least one prefabricated mist line comprising:
   at least one tube having a hole there through of a first predetermined diameter;
   at least one mist tee comprising:
   a body comprising a first outer diameter;
   at least one arm extending longitudinally outwardly from the body that is of a second predetermined diameter greater than the first predetermined diameter of the hole of the at least one tube, and the at least one arm also comprising a second outer diameter smaller than the first outer diameter of the body;
   a latitudinal threaded hole defined in the body; and
   a longitudinal hole extending through the at least one arm and at least into the body and in fluid communication with the latitudinal threaded hole; and
   wherein the at least one mist tee and the at least one tube are press-fit together thereby deforming an end portion of the at least one tube so that abuts the body.

2. The system of claim 1, the at least one mist tee further comprising a countersink defined in a surface of the body that surrounds an outer opening of the latitudinal threaded hole.

3. The system of claim 1, wherein the at least one arm comprises a tapered lead in at a free end portion of the at least one arm.

4. The system of claim 1, wherein the at least one arm comprises a gradual taper from the body to the end of the arm.

5. The system of claim 1, wherein the at least one arm comprises opposing arms extending outwardly from the body, and wherein the longitudinal hole extends through each arm and the body and is in fluid communication with the latitudinal threaded hole.

6. The system of claim 5, the at least one mist tee further comprising a countersink defined in a surface of the body that surrounds an outer opening of the latitudinal threaded hole, and wherein each arm of the at least one mist tee comprises a tapered lead in at a free end portion of the arm.

7. The system of claim 5, wherein each arm comprises a gradual taper from the body to the end of the arm.

8. The system of claim 1, wherein the at least one tube has at least one flared end abutting the body, thereby forming a curved transition between the body and the at least one tube.

9. The system of claim 8, wherein the at least one prefabricated mist line is rated up to about 200 psi to about 2,000 psi.

10. The system of claim 1 further comprising at least one union, at least one clamp, and at least one screw and anchor.

11. The system of claim 1, wherein the at least one prefabricated mist line comprises two prefabricated mist lines.

12. The system of claim 11 further comprising at least one feed line, at least one filter, at least one union, at least one end plug, at least one elbow, at least one clamp, and at least one screw and anchor.

13. A misting system comprising:
at least one prefabricated mist line comprising:
at least one tube having a hole there through of a first predetermined diameter;
at least one mist tee comprising:
a central body comprising a first outer diameter;
opposing arms extending longitudinally outwardly from opposite ends of the central body, each opposing arm being of a second predetermined diameter greater than the first predetermined diameter of the hole of the at least one tube, and each opposing arm also comprising a second outer diameter smaller than the first outer diameter of the central body;
a latitudinal threaded hole defined in the body; and
a longitudinal through hole extending through each arm and the body and in fluid communication with the latitudinal threaded through hole; and
wherein the at least one mist tee and the at least one tube are press-fit together thereby deforming an end portion of the at least one tube so that abuts the body.

14. The system of claim 13, the at least one prefabricated mist line further comprising at least one mist nozzle threadably and removably coupled with the latitudinal threaded hole.

15. The system of claim 13, the at least one mist tee further comprising a countersink defined in a surface of the body that surrounds an outer opening of the latitudinal threaded hole.

16. The system of claim 13, wherein each arm of the at least one mist tee comprises a gradual taper from the central body to the end of the arm.

17. The system of claim 13, wherein an interface of the at least one arm and the body is curved, and wherein the at least one tube has at least one flared lead in abutting the body, thereby forming a curved transition between the body and the at least one tube.

18. The system of claim 13, wherein the at least one tube comprises at least two tubes, wherein the at least one mist tee is press-fit between the at least two tubes.

19. The system of claim 13, wherein the at least one mist tee comprises at least two mist tees, wherein the at least one tube comprises at least three tubes, and wherein the at least two mist tees are press-fit between the at least three tubes.

20. The system of claim 13, wherein the at least one mist tee comprises at least three mist tees, wherein the at least one tube comprises at least four tubes, and wherein the at least three mist tees are press-fit between the at least four tubes.

21. The system of claim 13, wherein the at least one prefabricated mist line is rated up to about 150 psi to about 5,000 psi.

22. The system of claim 21, wherein the at least one prefabricated mist line is rated up to about 200 psi to about 2,000 psi.

23. The system of claim 13 further comprising at least one union, at least one clamp, and at least one screw and anchor.

24. The system of claim 13, wherein the at least one prefabricated mist line comprises two prefabricated mist lines.

25. The system of claim 24 further comprising at least one feed line, at least one filter, at least one union, at least one end plug, at least one elbow, at least one clamp, and at least one screw and anchor.

26. A method of forming a misting system, the method comprising:
prefabricating at least one mist line by:
providing at least one tube having a hole there through of a first predetermined diameter;
providing at least one mist tee having a body comprising a first outer diameter, at least one arm extending longitudinally outwardly from the body that is of a second predetermined diameter greater than the first predetermined diameter of the hole of the at least one tube—the at least one arm also comprising a second outer diameter smaller than the first outer diameter of the body, a latitudinal threaded hole defined in the body, and a longitudinal hole extending through the at least one arm and at least into the body and in fluid communication with the latitudinal threaded hole;
aligning an end of the at least one tube with the at least one arm; and
press-fitting the at least one arm into the end of the at least one tube, thereby deforming an end portion of the at least one tube so that abuts the body.

27. The method of claim 26, wherein the step of providing at least one tube comprises providing at least one tube having at least one flared end, wherein the step of aligning an end of the at least one tube comprises aligning the flared end of the at least one tube with the at least one arm, and wherein the step of press-fitting the at least one arm comprises forming a curved transition between the body and the at least one tube.

28. The method of claim 26, wherein the step of providing at least one mist tee comprises providing at least one arm having a tapered lead in at a free end portion thereof.

* * * * *